2,715,667

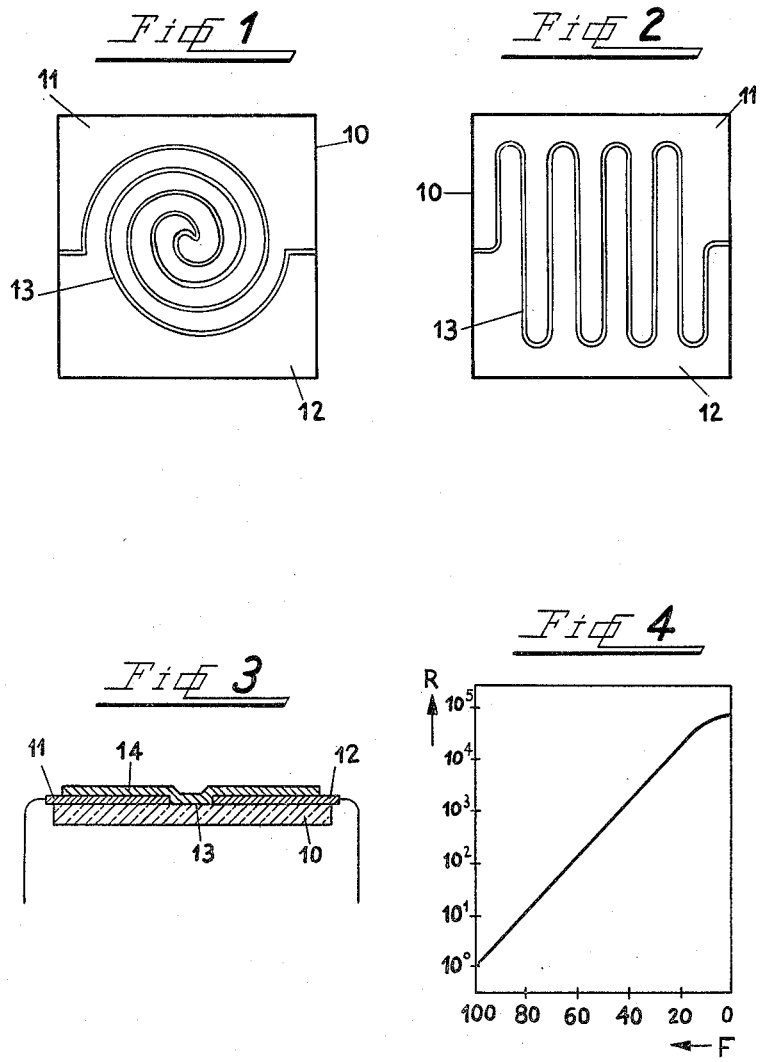

ELECTRIC HYGROMETER

Max Auwärter, Balzers, Liechtenstein, assignor to Alois Vogt, Vaduz, Liechtenstein Application May 15, 1951, Serial No. 226,441

Claims priority, application Switzerland May 17, 1950

15 Claims. (Cl. 201—63)

Various measuring processes are used for the measurement of the vapour content, especially the vapor content, in gaseous media.

In order to obtain scientific measuring results the dew point hygrometer, the absorption hygrometer or the psychrometer is used.

For technical control measurements the measuring apparatus mentioned has not been able to be introduced on account of the difficulty of their handling. In their place instruments are used, whose accuracy of measurement is small, but which allow readings to be made quickly. Such instruments are the hair hygrometer as well as apparatus operating according to diffusion methods; recently also apparatus has been used which depends for measurement on the electrical conductivity of electrolytes as influenced by the humidity, wherein the electrolytes are inserted in organic foils such for example as gelatine.

Even these previously known technical hygrometers have the disadvantage that they have a setting time which is too long.

Until a state of equilibrium is reached a period of time elapses, which, for example, is too slow for a control operation which uses the momentarily existing or "is" condition in order to establish the desired or "to be" condition. If the measurements take place in the atmosphere for meteorological purposes, the result of the subsequent measurement of moisture content is too late, on account of the time lag mentioned, to enable a completely accurate overall report to be prepared taking account of all factors simultaneously. This can lead to completely false results in the compiling of artillery data and can be fatal.

Also when measuring atmospheric humidity by means of radiosondes apparatus is practically exclusively used, which depends on the measurement of electrical conductivity. In this case the inertia of the setting of the necessarily thick carrier layers of the electrolyte operates disadvantageously on the prevailing relative moisture because if the radiosonde rises rapidly a phase shift between the measurement values for temperatures and humidity results which render exact weather forecasts extremely difficult or in part impossible. Finally instruments such as the hair hygrometer and the like which involve the conductivity of electrolytes show marked hysteresis phenomena which considerably falsify the results of measurement.

The present invention is intended to remove the disadvantages mentioned. It starts again from a hygrometer, suitable for technical measurements, in which the electrical conductivity of a substance mounted between electrodes and serving as a humidity sensitive element is used as a measure of the humidity.

According to the invention the thickness of the substance to be exposed to the atmosphere to be measured is less than $10^{-2}$ mm., and can even be less than $10^{-3}$ mm.

In the accompanying drawings embodiments by way of example of the invention are shown. The drawings show:

Figure 1, an embodiment of the hygrometer in plan,
Figure 2, a similar plan view of a second embodiment,
Figure 3, a diagrammatic section through the hygrometer,
Figure 4 illustrates the calibration curve of a hygrometer according to Figures 1 to 3 as a function of the electrical resistance in relation to the relative air dampness.

A carrier 10, for example of plate like shape, of electrical insulating material, which consists preferably of glass, quartz-glass or mica, is covered with two layer-shaped electrodes 11 and 12, which are separated from one another by a comparatively narrow gap 13. The electrodes 11 and 12 consist of a metal not attacked electrolytically, in particular of noble metals. A layer 14 serving as humidity sensitive element is, as is seen to an enlarged scale in Figure 3, deposited on the free part of the carrier 10 in the gap 13 between the electrodes and partially on the electrode layers to a thickness of less than $1 \times 10^{-2}$ mm. and even less than $1 \times 10^{-3}$ mm. The layer 14 can for example be produced by deposition of vapor of the substance in a high vacuum, and its thickness is in general not more than several wave lengths of light. The thin dimension of the layer 14 present in the gap 13 is perpendicular to the plane of the sheet of the electrodes 11 and 12. As can be seen from Figure 3, the thickness of the electrodes is of approximately the same order as the layer 14.

The substance of the layer serving as humidity indicator has to fulfill the requirement that it is not hygroscopic in the physical sense and also that at high moisture content of the gaseous atmosphere surrounding it, it does not deliquesce. The substance must therefore be difficulty soluble or insoluble in water, at least in the form of the thin film employed. Further, between the aqueous film absorbed on the layer 14 and the humidity present in the atmosphere there must be a balance corresponding from time to time to the degree of humidity.

The number of substances having these characteristics is relatively very small. In further development of the invention it was found as a result of numerous experiments and tests that difficultly soluble fluorides in particular water insoluble metal fluorides, either in the form of a compound such as magnesium fluoride or aluminium fluoride, or in the form of complexes of metal fluorides such as for example cryolite are suitable to fulfill all the requirements mentioned.

The electrodes 11 and 12 are so formed that the substance lying between them serves as moisture sensitive element and has an electrical series resistance as small as possible. For this purpose the gap 13 present between the electrodes 11 and 12 is as narrow as possible, and to obtain the greatest possible opposing electrode surfaces, it is coiled along the upper surface of the carrier 10. According to Figure 1 the gap 13 is of double spiral shape and according to Fig. 2 is of strip or meandering shape although other different shapes can obviously be used.

The electrical conductivity or the electrical resistance of the bridge formed by the substance of the layer 14 between the electrodes 11 and 12 is to a great degree influenced by the humidity of the atmosphere bounding the layer 14, since according to the above mentioned requirement the aqueous film absorbed on the layer is from time to time in a determined relationship with the atmospheric humidity. On account of the small thickness of the layer 14 the changes of electrical resistance thereof are only delayed to an unimportant extent with respect to the alteration of humidity. Practical tests have shown that the time necessary for reaching the final value of electrical resistance at a given humidity does not exceed 1 second and in the case of more favourable construction of the hygrometer is a fraction of a second.

Reference was made above to the thickness of the layer 14 because in the moisture measuring device of the present invention, the moisture of the ambient atmosphere penetrates such layer and does not merely form a film on the surface, and the presence of moisture in the body of the layer alters the electrical conductivity throughout the thickness of the layer. Whereas in prior devices, the measurement depends on the deposition of a film of moisture only on the surface of an insoluble material, so that a variation only in surface conductivity is obtained, in the device of the present invention, there is produced a change in the "volume conductivity," i. e., throughout the mass of the layer.

The alteration of the electrical resistance starting from a relative humidity of nil up to a relative humidity of 100% is effected in the case of a hygrometer of the kind described by five powers of ten. The corresponding calibration curve is shown in Figure 4, which illustrates the course of the electrical resistance R in dependence upon the relative atmospheric humidity F. The characteristic, with a linear humidity scale and a logarithmic conductivity scale is practically a linear function, on account of which it is extraordinarily easy to carry out the calibration over a humidity range from 0–100% of relative humidity by fixing a few measuring points, a possibility which is only available in a simple manner with the described construction of hygrometer.

The reproduction of the measurement itself is extremely good so that for instance it is possible to transmit relative humidity with a setting time of less than one second accurate to 0.01%. The measurements are more exact by at least two powers of ten than in all previously known hygrometers. The measuring current flowing through the hygrometer can on account of the preferred electrode arrangement described easily be maintained so great that for the measurement of higher humidities a milliammeter or a microammeter is sufficient. The two electrodes 11 and 12 of the hygrometer are preferably connected in one arm of a Wheatstone bridge.

Obviously, it is also possible to carry out the measurement electronically in that for example the potential arising between the electrodes 11 and 12 is conducted to the control grid and the cathode of an electron tube in order to control the anode current of the electron tube in this way. It is preferable for the protection of the electrodes against electrolytic influences to use an alternating current as the measuring current.

The substances serving as humidity sensitive elements, magnesium fluoride, aluminum fluoride and cryolite show themselves to be especially advantageous with regard to the temperature coefficients of the meter. Thus, for example, a hygrometer of the type described with a layer 14 consisting of magnesium fluoride serving as the humidity sensitive element shows at temperature variations of 0–14° C. a deviation of the humidity figure of 1.5% from the relative humidity to be measured. Obviously it is possible to correct the deviation by reference to the temperature coefficient to the desired accuracy.

The production of the described hygrometer is economically so favourable that it is also suitable for a wide use. The reading of results can be carried out by observers not skilled in the subject. Also the relative humidity can be especially well continuously recorded.

What I claim is:

1. In an electric hygrometer, the combination with a pair of spaced electrodes having a gap therebetween, of a non-porous fluoride, relatively insoluble in water and arranged in electrical contact with the electrodes within said gap and exposed at its surface to the atmosphere whose moisture content is to be measured.

2. In an electric hygrometer, the combination with a pair of spaced electrodes having a gap therebetween, of a layer of magnesium fluoride arranged in electrical contact with the electrodes within said gap and exposed at its surface to the atmosphere whose moisture content is to be measured.

3. In an electric hygrometer, the combination with a pair of spaced electrodes having a gap therebetween, of a layer of aluminium fluoride arranged in electrical contact with the electrodes within said gap and exposed at its surface to the atmosphere whose moisture content is to be measured.

4. In an electric hygrometer, the combination with a pair of spaced electrodes having a gap therebetween, of a layer of cryolite arranged in electrical contact with the electrodes within said gap and exposed at its surface to the atmosphere whose moisture content is to be measured.

5. Process for the manufacture of an electric hygrometer of the type including spaced electrodes, supported on an insulating carrier and having at least between them a moisture sensitive substance, comprising the steps of arranging the said electrodes on the carrier with a space therebetween, evaporating in a high vacuum an inorganic material which is non-porous in its solid form and is relatively insoluble in water, and precipitating the material as a condensate in a thin layer at least between the electrodes.

6. Process for the manufacture of an electric hygrometer of the type including spaced electrodes, supported on an insulating carrier and having between them and also overlying them a moisture sensitive substance, comprising the steps of arranging the said electrodes on a carrier with a space therebetween, evaporating in a high vacuum an inorganic material which is non-porous in its solid form and is relatively insoluble in water, and precipitating the material as a condensate in a thin layer on and between the electrodes.

7. In an electric hygrometer, the combination with an insulating base and a pair of spaced electrodes thereon having a gap therebetween, of a moisture-absorbing layer of inorganic, non-porous, only slightly water-soluble material disposed on said base and within and substantially filling the gap between the electrodes, said layer being in electrical contact with the electrodes, so that a measuring current flowing between the electrodes passes through the body of said layer, said layer being exposed at its surfaces to the atmosphere whose moisture content is to be measured, the thickness of said layer, measured vertically to the surface of said electrodes, being less than $10^{-2}$ mm.

8. An electric hygrometer as defined in claim 7, wherein the thickness of said layer is less than $10^{-3}$ mm.

9. An electric hygrometer as defined in claim 7, wherein the said layer is constituted of a film precipitated from the vapor state of the material.

10. An electric hygrometer as defined in claim 1, wherein the fluoride layer is less than $1 \times 10^{-2}$ mm. thick.

11. An electric hygrometer as defined in claim 1, wherein the fluoride layer is less than $1 \times 10^{-2}$ mm. thick and is constituted of a film precipitated from the vapor state of the material.

12. In an electric hygrometer, the combination with an insulating base having thereon a pair of spaced electrodes with a tortuous gap therebetween, of a layer of inorganic, non-porous, only slightly water-soluble material disposed on said base and within the gap and substantially filling the same, said layer being in electrical contact with the electrodes, so that a measuring current flowing between the electrodes passes through the body of said layer, said layer being exposed at its surfaces to the atmosphere whose moisture contents is to be measured and the thickness of said layer, measured vertically to the surface of the electrodes, being less than $10^{-2}$ mm.

13. An electric hygrometer as defined in claim 7, wherein the electrodes are of approximately the same order of thickness as the said inorganic material.

14. An electric hygrometer as defined in claim 7, wherein the insulating base is made of quartz glass.

15. An electric hygrometer as defined in claim 7, wherein the insulating base is made of mica.

References Cited in the file of this patent

UNITED STATES PATENTS

| | | |
|---|---|---|
| 241,909 | Bell et al. | May 24, 1881 |
| 1,749,826 | Lubach | Mar. 11, 1930 |
| 1,942,958 | Carpenter | Jan. 9, 1934 |
| 2,381,299 | McCulloch | Aug. 7, 1945 |
| 2,458,348 | Cleveland | Jan. 9, 1949 |
| 2,481,728 | Dember | Sept. 13, 1949 |
| 2,542,944 | Rieber | Feb. 20, 1951 |